United States Patent [19]

Cueman et al.

[11] Patent Number: 5,000,979

[45] Date of Patent: Mar. 19, 1991

[54] PROCESS FOR COATING A SUBSTRATE FOR ISOLATION FROM HOSTILE ENVIRONMENTS

[75] Inventors: Glenn F. Cueman; J. Edwin Day, both of Charlotte; James W. Gilpin, Davidson; Dale T. Jessop, Matthews; A. Lowell Snow; Robert S. Watterson, III, both of Charlotte, all of N.C.

[73] Assignee: Avancer Technologies, Inc., Charlotte, N.C.

[21] Appl. No.: 286,515

[22] Filed: Dec. 19, 1988

Related U.S. Application Data

[63] Continuation-in-part of Ser. No. 845,095, Mar. 27, 1986, abandoned.

[51] Int. Cl.$^5$ ............................ B05D 1/06; B05D 1/24
[52] U.S. Cl. ............................................. 427/27; 427/28
[58] Field of Search ................... 427/27, 185, 28, 203, 427/182, 195, 33, 201

[56] References Cited

U.S. PATENT DOCUMENTS

| | | | |
|---|---|---|---|
| 3,090,696 | 5/1963 | Gemmer | 427/195 X |
| 3,140,195 | 7/1964 | Nagel | 427/185 |
| 3,513,012 | 5/1970 | Point | 427/27 |
| 3,770,482 | 11/1973 | Millar et al. | 427/27 |
| 4,179,542 | 12/1979 | Christotas et al. | 427/201 X |
| 4,481,239 | 11/1984 | Eckner | 427/202 X |
| 4,689,241 | 8/1987 | Richart et al. | 427/182 X |

*Primary Examiner*—Evan Lawrence
*Attorney, Agent, or Firm*—Ralph H. Dougherty

[57] ABSTRACT

A process for coating a substrate such as steel, that will hold an electrostatic charge, wherein a first coating of a thermosetting resin an amine cured opoxy resin of the family diglycidylether of bisphenol-A, is applied to the substrate electrostatically or by fluidized bed methods, a second layer of thermoplastic material is applied electrostatically to the coating of thermosetting material, the substrate is heated and the coatings are cured and bonded to the substrate and to each other at a temperature of from 355° F. to 430° F. for a period of about 6 to about 22 minutes, whereby the first and second coating materials become cross-linked and develop a high degree of impermeability.

Coated substrates made according to the process can be used in the fabrication of items that must withstand ultraviolet or nuclear radiation plus chemical and corrosive attack including containers for toxic and hazardous materials, as well as low level radioactive materials.

19 Claims, No Drawings

PROCESS FOR COATING A SUBSTRATE FOR ISOLATION FROM HOSTILE ENVIRONMENTS

CROSS-REFERENCE TO RELATED APPLICATION

This is a continuation-in-part application of U.S. Pat. application Ser. No. 845,095, filed Mar. 27, 1986 now abandoned.

BACKGROUND OF THE INVENTION

The present invention relates to a process for coating metallic substrates which can be used in the fabrication of containers for toxic and hazardous (T & H) wastes, as well as low level radioactive waste (LLRW), and the resulting containers. The coated substrate has enhanced chemical and corrosion resistance, which provides a basis for use under a variety of harsh and/or hostile environments.

In the handling of these types of waste, waste material is often placed in steel barrels with various types of treatments such as encapsulating the waste in chemicals, gelatin, bitumen or cement, burning the waste and placing the burned waste or agglomerate in barrels. The barrels then usually are buried, and on rare occasion have been known to be further encapsulated in a concrete waste-receiving "tomb".

Government regulations regarding the disposal of T & H and LLRW have proliferated during the last decade, and improperly handled waste has generated both the levying of fines and the filing of law suits against the waste disposer.

Waste containers must meet a variety of technical standards because of the large number of materials and types of materials which are disposed of in such containers. In addition, varying environmental conditions are encountered in the disposal of the hazardous waste. Because many waste products are incinerated or processed at elevated temperatures and then immediately placed into a container, the container must also be thermally resistant.

LLRW and T & H wastes and other hazardous materials are, in many cases, presently disposed of by storing in standard, relatively inexpensive, 55 gallon drums, or in high integrity containers (HICs) which are considerably more expensive. Standard 55-gallon steel drums can deteriorate within 20 to 30 years, resulting in leakage or loss of contents. This deterioration is unacceptable for both below ground burial and above-ground storage. Presently used HICs are made of concrete, stainless steel, or polyethylene materials and have several limitations beyond that of high cost. All prior art containers of a 55-gallon drum size have reduced capacity. Each container is thickly lined. Some contain concrete that is 5 or 6 inches thick. Such containers not only have limited capacity, but also are extremely heavy to handle and transport, and use up large amounts of available burial space. Molded polyethylene containers can be biodegradable under certain conditions, they have poor creep performance, and are subject to attack by a variety of chemicals. They also deteriorate under only moderately high temperature, are readily attacked by radiation, and occasionally rupture under pressure. Concrete HICs have extremely high bulk, and they crumble and otherwise deteriorate after only a moderate life span. Stainless steel, on the other hand, must be of a special grade with the consequence of extremely high cost.

Eckner U.S. Pat. No. 4,481,239 teaches a process for coating metallic substrates, particularly pipes, wherein the substrate is preheated. A powder coating is electrostatically applied to the surface of the substrate and melted as a result of the high preheating temperature. The process uses one heat hardenable synthetic resin in combination with hardening agents and cross linkable acrylate resins, a stabilized ethylene copolymer, and optionally polyolefin. These are substantially different materials from those of the present invention, which materials are placed onto a basically steel substrate with the resulting coating substituting for standard pipe wrapping.

Point U.S. Pat. No. 3,513,012 teaches a process for coating an article with substances that are convertible into two continuous but separate solid layers. Electrically charged particles are electrostatically deposited on the first unconverted layer. Point also teaches that the particles are carried to a high electrical potential of about 100 kilovolts as they are discharged adjacent the substrate.

We have invented a method for coating substrates, especially metallic substrates, and in particular for coating a steel drum, which is capable of withstanding high impact, is not subject to corrosion, and thus is extremely well suited for the containment of T & H, LLRW, and other corrosive wastes at relatively low cost. The metallic substrate in the present invention is coated with a combination of a thermosetting resin and a thermoplastic material, which can be simultaneously cured in place.

The invention comprehends high integrity containers, having chemical resistance, radiation resistance, and long term corrosion resistance, and provides a process for making containers which meet tests for such resistance for up to 18,000 to 20,000 hours. Such containers are resistant to attack from corrosive chemicals, caustic chemicals, and radiation.

Until very recently, no coating exceeding around 1000 hours of corrosion resistance to salt spray was available, and until the present invention, no coating exceeded 4000 hours. Applicants' corrosion life of 20,000 hours is far beyond the prior achievements. Such life defines a "high integrity container". Without achieving this result, it would not be possible to extrapolate a 300 year life that the Nuclear Regulatory Commission requires. Standard epoxy with nylon fails to achieve the desired result.

In a high integrity container, when coated in accordance with the invented method, exotic stainless steel can be replaced with inexpensive carbon or alloy steels.

A steel drum, such as a standard 55-gallon drum, is not easily coated by powder coating. Any object having 90 degree corners, and large contained surfaces, develops powder build-ups in the corners. For this reason, drums are not powder-coated today. In addition, in prior techniques, powder is blown off the large surfaces during the coating process, and the coating is not uniform. Drums have been epoxy coated in the past, but not powder coated. The inside of drums have never before been effectively coated.

SUMMARY OF THE INVENTION

The invention is a process for coating a metallic or nonmetallic substrate, but preferably steel, including the steps of: selecting a substrate that will hold an electrostatic charge; cleaning the surface of the substrate; grounding the substrate; electrostatically applying a first coating of a negatively charged thermosetting resin to the substrate; applying a second layer of positively charged thermoplastic material to the coating of thermosetting material by electrostatic means; heating the substrate and coatings to a temperature of from 355° to 430° F., preferably from 360° to 420° F., and holding the heat at that temperature for a period of from 6 to 22 minutes, resulting in the first and second coatings becoming tightly bonded to the substrate and molecularly cross-linked, whereby they develop outstanding resistance to permeability. The thermosetting resin is a finely divided thermosetting amine cured epoxy of the family diglycidyl ether of bisphenol-A, which has been highly modified for marine applications. The thermoplastic material is a resin selected from the group consisting of nylon 6, nylon 6-6, nylon 11, polyvinylidene fluoride polymer, and the polyethylene family of thermoplastic resins (polyethylene, polypropylene, polybutylene, etc.)

By initially electrostatically bonding the powdered materials, uniform and complete coverage of all surfaces is assured. When the thermoset and thermoplastic materials are simultaneously cured in place, the properties of both are optimized. The thermoset bonds aggressively to the metallic substrate, while the thermoplastic provides superior abrasion, chemical and ultraviolet (U.V.) radiation resistance. Typically, it is very difficult to achieve good bonding between thermosets and thermoplastics without priming and other surface preparations between layers. The process of cofiring these powders allows superior fusion of the two materials, but the final coating retains the attributes of both, as they cross-link to form a non-porous polymer.

The invention is also a method for coating a steel container such as a conventional 55-gallon drum, and which product is compatible with all existing filling, handling and storage facilities. The existing container is identified by the U.S. Department of Transportation as a 17F or 17H container, or similarly coded container, and meets all of the DOT LLRW containment requirements.

The coated steel material resulting from this invention is expected to receive the Nuclear Regulatory Commission approval for the burial of Class A, B, and C LLRW, since the material will remain stable after long term contact with radioactive materials ($10^8$ rads), and is not subject to attack by the most commonly used acids, solvents, or caustic material. Because of the corrosion resistance of the invented container, either above-ground or below-ground storage for 300 years is believed to be readily achievable. Impact and abrasion resistant properties allow normal handling procedures to be employed. In addition, the cost of the containers is significantly less than currently available high integrity containers.

OBJECTS OF THE INVENTION

It is the principal object of this invention to provide a process for the coating of substrates, including metallic substrates, to be used in making containers for the disposal of waste products, including T & H waste, LLRW, and other hazardous materials.

It is another object of this invention to provide a method for producing coated metallic materials which are impermeable to toxic, corrosive, and hazardous materials.

It is another object of this invention to provide a method for producing a coated metallic or non-metallic substrate having high impact and abrasion resistance.

It is another object of this invention to provide a method for producing a coated metallic substrate having extremely high corrosion resistance in a variety of hostile environments.

It is also an object of this invention to provide a method for producing a coated metallic substrate having a tightly adherent coating on all exposed surfaces, including welds and joints.

It is another object of this invention to provide a method for producing a coated metallic container which is resistant to attack by both the environment and the materials to be contained therein.

These and other objects will become more fully understood by reference to the following detailed description of the invention.

DETAILED DESCRIPTION OF THE INVENTION

A protective coating of a thermoset polymeric material, a thermosetting amine cured epoxy of the family diglycidylether of bisphenol-A, is deposited onto a metallic or non-metallic substrate. A second coating of thermoplastic material is then deposited onto the first coating, and the coatings are cured and thermally bonded to the substrate and to each other. The preferred bonding and curing process is referred to as co-firing.

The thermoplastic material is a resin selected from the group consisting of nylon 6, nylon, 6-6, nylon 11, polyvinylidene fluoride polymer, and the family of polyethylene thermoplastic resins.

The first coating provides enhanced corrosion resistance, particularly when a container made from the coated substrate is buried in the earth. The coating also protects the container from internal damages from waste materials contained therein.

The second protective coating is bonded to the first to form a cross-linked laminate. The second layer of thermoplastic material, such as nylon 11, will provide increased chemical and corrosion resistance, along with substantially increased abrasion resistance. An additional benefit is resistance to ultraviolet radiation. Note that both the coating materials, aromatic amine cured epoxy and nylon 11, will withstand radiation to $10^8$ rads, and are resistant to chemicals having a broad range of pH (in the range of from 3 to 10 pH).

Suitable substrates are metallic or non-metallic solids capable of holding an electrostatic charge, and capable of remaining stable, both chemically and structurally, i.e. holding its shape, at a temperature of from 300° to 600° F. Such substrates include non-ferrous and ferrous metals, glass and other high silica materials, plastics and thermoplastics. Ferrous metals suited as substrates are iron and steel, including hot rolled steel, cold rolled steel, alloy steel, and stainless steel. For some applications, aluminum, titanium, titanium alloys, nickel and its alloys, molybdenum, manganese, copper alloys, tin, zinc, brass, bronze, and other metals or alloys may be preferable to iron or steel as substrates.

The substrate must be clean of dirt and grease. For iron or steel, suitable cleaning means for the substrate include blasting, such as sand, shot or bead blasting, or etching. This can be followed by a phosphatizing process, if desired. Phosphatizing is the process of cleaning, etching, and bonding a phosphate to the surface of the metallic substrate to enhance the bonding of the coating materials. When the substrate is aluminum, it can be sand blasted or etched and anodized. When the thermoplastic material is a nylon, the primer can be a liquid nylon.

Following surface preparation, the substrate is grounded. Negatively charged particles of a thermosetting polymeric material are applied to the substrate by electrostatic powder coating at high voltage (60 to 100 kv). A second layer of particulate thermoplastic material is positively charged and applied over the thermoset material by means of electrostatic powder coating at a substantially lower voltage (10 to 50 kv). The dual coated substrate is then heated to raise the temperature of both the substrate and the coatings into the range of 360° to 420° F. and held for a period of from 6 to 22 minutes, preferably from 8 to 15 minutes.

The process is operated in the following manner:

After cleaning the substrate by shotblasting and/or phosphatizing, the epoxy is applied electrostatically with a negative polarity gun with a ground path between the negative polarity gun and the substrate.

Then nylon 11 in powder form is applied to the same substrate with a positive polarity gun and without any ground connection between the positive polarity gun and the substrate. This takes advantage of the previous charge on the first applied coating.

The negative charged powder is put on with a differential of 60 to 100 kv. The nylon is then applied at 10 to 50 kv, a substantially lower differential voltage.

A theory to which we subscribe, but do not wish to be held, is that the nylon, when put on at a high voltage, moves through the first coating, leaving gaps in the nylon on the outer surface, requiring an additional coating step, thus the requirement for the low voltage in the thermoplastic powder application step.

The only known suitable thermosetting resins are thermosetting amine cured epoxies of the family diglycidylether of bisphenol-A (DGEBA), which have been highly modified for marine applications, and are available from Armstrong Division of Morton Thiokol Corporation as Armstrong E-42403-4N Powder Coating.

Suitable thermoplastic resins include nylon 6, nylon 6, nylon 11, polyvinylidine fluoride polymers, polyethylene, and other thermoplastic resins. nylon 11 is particularly well suited as a preferred thermoplastic material, because it is resistant to both abrasion and deterioration under ultraviolet light, for the reason that it is a fully cross-linked material.

Nylon is a difficult material to bond. Exotic nylon primers are in common use to hold nylon onto substrates. These are typically liquid dispersion primers which contain nylon. This allows the nylon powder to bond to a like material. The present process avoids the use of primers. However, unless the curing ranges are as taught herein, applicants' tightly adherent coating will not be obtained.

The preferred range of particle sizes (U.S. Standard screens) of the powdered thermoplastic and thermosetting materials are:

at least 85% of the particles pass a 200 mesh screen, and 50 to 90% of the particles pass a 400 mesh screen.

Any type heating is suitable for the curing and bonding process, including induction, radiant, convective, and electrical resistance heating. Note that for non-metallic substrates, micro-wave heating may be suitable.

A high-integrity steel drum container, preferably of ordinary carbon steel, is made by the present invention, by selecting a steel drum of the desired size and configuration, and of the desired composition, suspending the drum with its closed bottom elevated above its open top, electrodepositing a negatively-charged first thermosetting powder into the interior of the drum, while grounded to the negative polarity electrodepositing gun, deposit the thermoplastic powder by a positive polarity electrodepositing gun without the drum being grounded, then curing the interior powder coating for 6 to 22 minutes at a temperature of 360° to 420° F.; then electrodeposit the first and second powders on the exterior of the drum in the same manner as depositing on the drum interior, then curing the exterior coating.

Alternatively, the interior portions of a drum are coated in the unassembled state (a drum body open at both ends, a top cover, and a bottom cover) and cured, then assembled by roll forming of the top cover seam and the bottom cover seam, after which the exterior of the assembled drum is coated, and heat cured.

The preferred method for applying the protective layers of thermoset and thermoplastic polymeric materials is electrostatic powder coating. By this method, specially ground powders of the materials are electrostatically bound to a metallic substrate, initially. The electric charge attracts the coating particles onto the substrate in a uniform fashion covering all exposed surfaces including crevices. The electrostatic coating process results in a uniform continuous layer of materials covering all exposed substrate surfaces, joints, and welds.

Similar results can be achieved using fluidized bed coating methods. The invention also comprehends applying either coat by electrostatic means and the other coat by fluidized bed means.

By proper selection of powder composition and particle size, outstanding adhesion properties are developed, in addition to the achievement of superior resistance to corrosion and chemical attack.

An alternative method of coating and curing a substrate is known as dual firing. Thermosetting material in powder form is applied to the substrate, preferably by electrostatic application, and the coated substrate is then heated to a temperature in the range of 350° to 440° F., but preferably in the range of 360° to 420° F., and held at such temperature for a period of from about 6 to 22 minutes, preferably about 8 to 15 minutes, and optimally about 10 minutes, creating a strong bond between the thermoset material and the metal substrate, and fusing the powder into a nonporous polymeric coating.

After the polymeric material is bonded onto the substrate, the epoxy-coated substrate is cleaned or otherwise prepared. A second coating consisting of a thermoplastic material, such as Nylon-11, is then also deposited on the first by electrostatic coating procedures. A second heat curing procedure assures complete bonding to the first layer.

The second heat treatment is carried out at a temperature of from 350° F. to 385° F., and optimally at 363° F., and held for a period of from 6 to 22 minutes, preferably about 8 to 15 minutes, and optimally about 10 minutes.

The resulting coated substrate has two layers tightly bonded to each other as well as to the metal substrate.

When extremely acidic materials are to be contained, a polymer such as polyvinylidine fluoride can be utilized in place of Nylon 11, which will result in improved long term stability. This polymer is also a thermoplastic material, although some forms of it require high curing temperatures, sometimes as high as 585° F.

The combination of a thermosetting material such as epoxy and a thermoplastic material such as nylon 11 has the synergistic result of enhancement of the properties of both materials. Significantly increased resistance to chemical, mechanical, environmental, and nuclear as well as ultra violet radiation damage is achieved. By properly electrostatically powder coating and heating the materials, the integrity of the resulting dual-bonded and coated substrate is greatly enhanced.

The present invention, by either co-firing or dual firing, results in a much more strongly adherent coating than has heretofore been available for T & H or LLRW containers. The resulting coated substrate has been thoroughly tested for coating adherence and for impact and corrosion resistance.

Tables I and II show the results of testing the materials of our coating under the conditions and by the tests specified. The Chemical Resistance Tests clearly indicate that the materials are well suited for toxic and hazardous waste container usage.

TABLE I

| TEST TYPE | TEST METHOD | VALUES/RESULTS |
| --- | --- | --- |
| Impact (⅜" tup) | ASTM D2794 | 160 in. lbs. |
| Flexibility | ASTM D1737 | 90 deg., ¼" conical & straight mandrels |
| Pencil Hardness | ASTM D3363 | 4H |
| Salt Spray | ASTM B117 | 18,000 hrs., no creepage @ scribe, no blisters |

TABLE I-continued

| TEST TYPE | TEST METHOD | VALUES/RESULTS |
| --- | --- | --- |
| Abrasion Resistance | ASTM D1044 | |
| | CS17 Wheel 1000 gm. wt. | 14 mg. loss per 1000 cycles |
| | CS10 Wheel 1000 gm. wt. | 7 mg. loss per 1000 cycles |
| 185 deg. F. water | 60 day test (immersion) | No blister or delamination |
| Marine Spray Zone (24 Month) | LaQue Center for Corrosion Technology | 0–1 mm. undercut No blisters |
| Cold Brittleness | ASTM D746 | −94 deg. F. |
| Dielectric Strength | ASTM D149 | 1700 V per mil |
| Coating Adhesion | ASTM B449 | 100% pass |

TABLE II

| TEST TYPE | TEST METHOD | VALUES/RESULTS |
| --- | --- | --- |
| Chemical Resistance | ASTM G20 (6 Months) | |
| Gasoline | " | No effect |
| Heptane | " | " |
| 6% Bleach | " | " |
| 10% NaOH | " | " |
| 25% NaOH | " | " |
| 15% Ammonia | " | " |
| 28% Ammonia | " | " |
| 10% NaCl | " | " |
| Mineral Oil | " | " |
| 10% Ammonium Hydroxide | " | " |
| Alcohols | " | " |
| Ethyl Acetate | " | " |
| Potable H$_2$O | " | " |
| Carbon Tetrachloride | " | " |
| Chemical Resistance | " | |
| 15% Nitric Acid | " | " |
| 15% Sulfuric Acid | " | " |
| 40% Sulfuric Acid | " | " |
| 15% Phosphoric Acid | " | " |
| 40% Phosphoric Acid | " | " |
| 15% Hydrochloric Acid | " | " |
| 25% Acetic Acid | " | " |
| Toluene | " | " |
| 5% Lactic Acid | " | " |
| Oleic Acid | " | " |
| Stearic Acid | " | " |
| Aluminum Sulfate | " | " |
| Ammonium Chloride, Nitrate & Sulfate | " | " |
| Copper Chloride, Nitrate & Sulfate | " | " |
| Iron Chloride, Nitrate & Sulfate | " | " |
| Nickel Chloride, Nitrate & Sulfate | " | " |
| Zinc Chloride, | " | " |

TABLE II-continued

| TEST TYPE | TEST METHOD | VALUES/RESULTS |
|---|---|---|
| Nitrate & Sulfate | | |
| Magnesium Chloride, Nitrate & Sulfate | " | " |
| Potassium Chloride, Nitrate & Sulfate | " | " |
| Sodium Chloride, Nitrate & Sulfate | " | " |
| Aliphatic Hydrocarbons | " | " |
| Chlorinated Hydrocarbons | " | " |
| Ketones | " | " |
| Ethers | " | " |
| Esters | " | " |
| Benzene | " | " |
| Chloro Benzene | " | " |
| Mineral Oils | " | " |
| Vegetable Oils | " | " |

SUMMARY OF THE ACHIEVEMENT OF THE OBJECTS OF THE INVENTION

Our coating has superior qualities of appearance, adhesion, high temperature resistance, low temperature resistance, U. V. resistance, radiation stability, impact resistance, and abrasion resistance. It has high resistance to solvents, including both low pH and high pH chemicals, and ground water. The coating has outstanding adherence to the substrate during and subsequent to bending, and containers made from our coated substrate have low cost when compared to other commercially available hazardous waste container materials.

It is readily apparent that we have provided a process for the coating of metallic and non-metallic substrates, well suited for use in making containers for the disposal of waste products, including toxic waste, nuclear waste and other hazardous wastes, which coated substrate has an ultra high resistance to corrosion and chemical attack, and can therefore be used in other applications where these qualities are desirable and useful. We have also provided a method for coating a steel drum substrate useful as a hazardous waste container having a 300 year life, as well as a toxic, nuclear, and hazardous waste container.

In accordance with the patent statutes, preferred and alternative embodiments of the invention have been described. However, it will be appreciated that changes and modifications can be made to the invention without departing from the spirit thereof. Therefore, this invention is limited only by the scope of the following claims.

What is claimed is:

1. A process for coating a metallic substrate comprising, sequentially:
   selecting a metallic substrate that will hold an electrostatic charge;
   preparing the surface of the substrate for coating;
   grounding the substrate;
   electrostatically applying a negatively charged first coating of an uncured, heat curable, powdered thermosetting amine cured epoxy resin of the family diglycidylether of bisphenol-A, at least 85%l of the particles of which pass a 200 mesh screen, to the substrate;
   applying a second layer of a positively charged, uncured, powdered thermoplastic material, at least 85% of the particles of which pass a 200 mesh screen, to said coating of uncured thermosetting material by electrostatic methods at lower differential voltage than the first coating; and
   thereafter heating the substrate and said first and second coatings to a temperature of from 355° F. to 430° F. and holding the temperature for a period of from 6 to 22 minutes;
   whereby said first and second coating materials become bonded to each other and to the substrate, as well as becoming internally cross-linked, to develop a high degree of impermeability.

2. A process according to claim 1 wherein said thermosetting resin is a material which has been highly modified for marine applications.

3. A process according to claim 1 wherein said thermoplastic material is a resin selected from the group consisting of nylon 6, nylon 6-6, nylon 11, polyvinylidene fluoride polymer, and polyethylene-type thermoplastic resins.

4. A process according to claim 1 wherein from 50 to 90% of said particles of powdered thermosetting resin and powdered thermoplastic pass a 400 mesh screen.

5. A process according to claim 1 wherein said substrate is a material which will remain stable at a temperature from 300° F. to 600° F.

6. A process according to claim 1 wherein said substrate is a ferrous metal.

7. A process according to claim 6 wherein said substrate is selected from the group consisting of hot rolled steel, cold rolled steel, alloy steel, and stainless steel.

8. A process according to claim 1 wherein said substrate is a non-ferrous metal selected from the group consisting of aluminum, titanium, nickel, tin, copper, molybdenum, zinc, and manganese, alloys thereof, brass, and bronze.

9. A process according to claim 1 wherein said substrate is prepared by cleaning.

10. A process according to claim 9 wherein said substrate is prepared by shot-blasting, bead blasting, or sand blasting.

11. A process according to claim 1 wherein said substrate is aluminum, and said substrate is prepared by etching and anodizing.

12. A process according to claim 1 wherein said substrate is prepared by cleaning and phosphatizing.

13. A process according to claim 1 wherein said substrate is heated to a temperature in the range of 360° to 385° F. and held for a period of from 8 to 15 minutes.

14. A process according to claim 1 wherein said substrate is a finished container.

15. A process according to claim 14 wherein said substrate is a steel drum.

16. A method of coating a substrate comprising sequentially:

preparing said substrate for coating by cleaning said substrate;

electrostatically charging said substrate;

placing said substrate within a fluidized bed of an uncured, at least 85% under 200 mesh, powdered thermosetting amine cured epoxy resin of the family diglycidylether of bisphenol-A;

activating said fluidized bed to coat said substrate thoroughly;

electrostatically applying a second coat of a powdered, at least 85% under 200 mesh, thermoplastic material to the coated substrate;

heating said substrate and said first and second coating to a temperature of from 355° F. to 430° F. and holding said temperature for a period of about 6 to about 22 minutes.

17. A process according to claim 16 wherein said thermoplastic material is a resin selected from the group consisting of nylon 6, nylon 6-6, nylon 11, polyvinylidene fluoride polymer, and polyethylene-type thermoplastic resins.

18. A process according to claim 16 wherein said substrate is heated to a temperature of from 360° to 420° F. and held for a period of from 8 to 15 minutes.

19. A process according to claim 16 wherein at from 50 to 90% of all particles of powdered thermosetting resin and powdered thermoplastic pass a 400 mesh screen.

* * * * *